Sept. 1, 1953  C. E. COPLEY  2,650,508
SAW SHARPENING DEVICE
Filed June 23, 1951  2 Sheets-Sheet 1
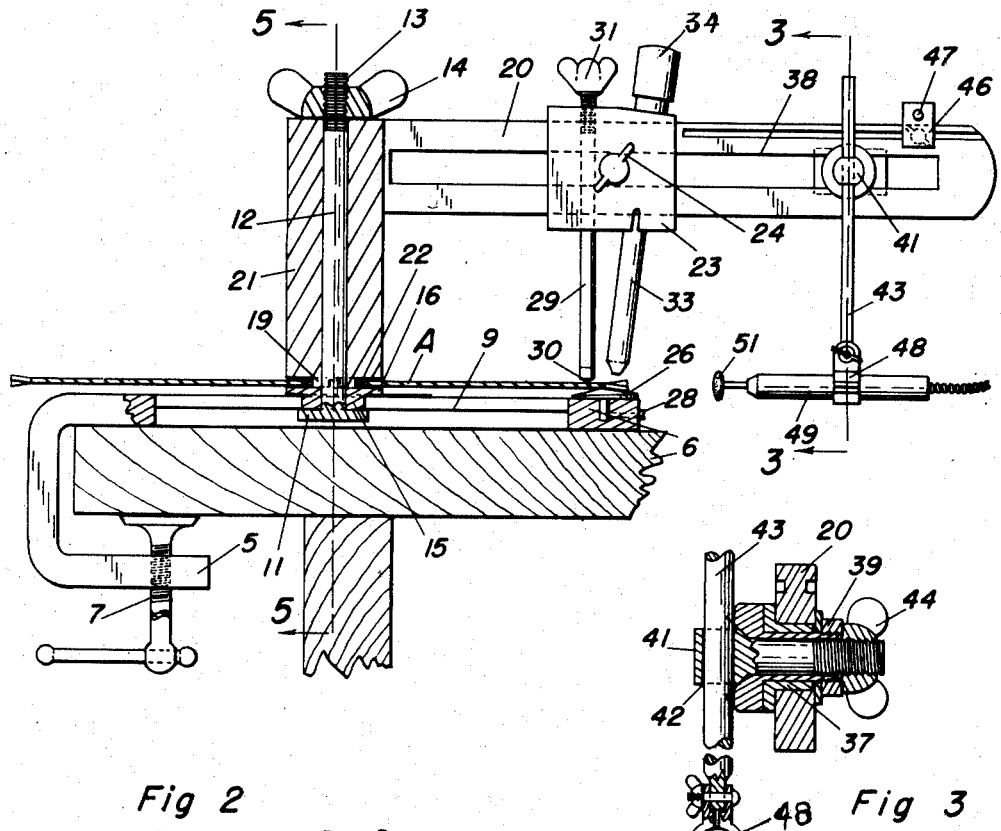
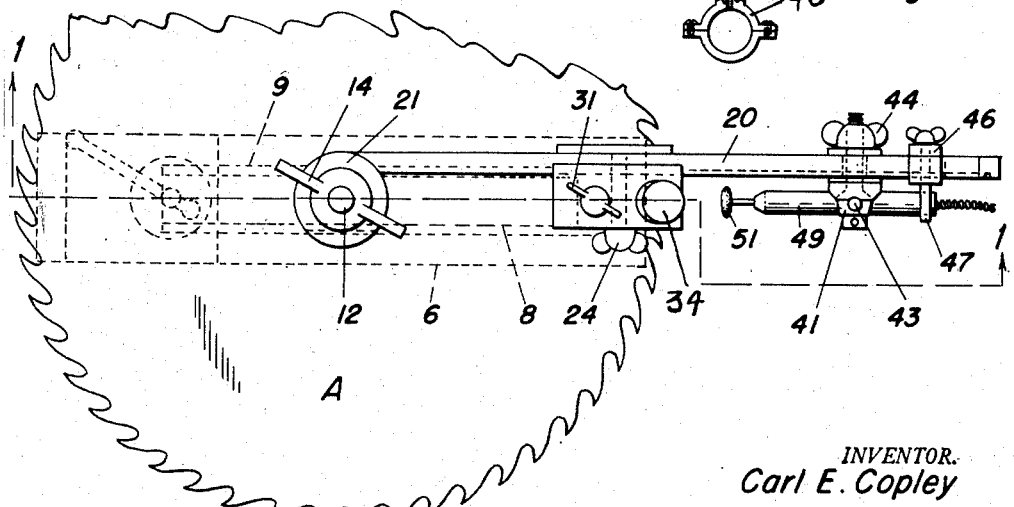
INVENTOR.
Carl E. Copley
BY
Att'y Sept. 1, 1953   C. E. COPLEY   2,650,508
SAW SHARPENING DEVICE
Filed June 23, 1951   2 Sheets-Sheet 2

INVENTOR.
Carl E. Copley
BY
Att'y

Patented Sept. 1, 1953

2,650,508

UNITED STATES PATENT OFFICE 2,650,508

SAW SHARPENING DEVICE

Carl E. Copley, Colma, Calif.

Application June 23, 1951, Serial No. 233,172

3 Claims. (Cl. 76—37)

This invention relates to improvements in saw sharpening and setting devices.

The principal object of this invention is to produce a device which will condition a circular saw so that all of the teeth are the same length, sharpened and set evenly so that the saw will make a perfect cut.

A further object of this invention is to produce a device which is adjustable to various sized saws and saws having various teeth shapes.

A further object is to produce a device of this character which is economical to manufacture, easy to use and one which may be readily transported.

Other objects and advantages will be apparent during the course of the following description.

In the accompanying drawings forming a part of this specification and in which like numbers are employed to designate like parts throughout the same, Fig. 1 is a cross sectional view taken on the line 1—1 of Fig. 2;

Fig. 2 is a top plan view of Fig. 1;

Fig. 3 is an enlarged fragmentary detail view of the supporting clamp;

Figures 4, 5:
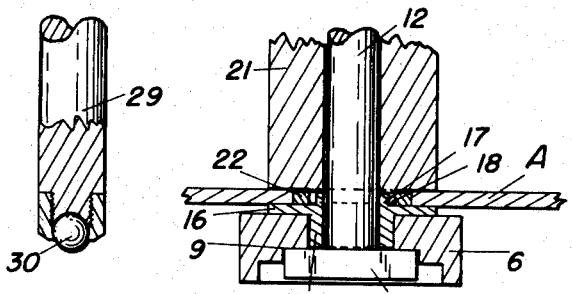
Fig. 4 is a fragmentary detail view on an enlarged scale of the hold-down bar.
Fig. 5 is a cross sectional view taken on the line 5—5 of Fig. 1, looking in the direction of the arrow.

Rotary saws are mounted upon a rotating shaft or arbor and are driven at comparatively high speeds. It is therefore important that all of the teeth of the saw be of the same length in respect to the diameter of the saw and properly set in order that the saw may be balanced so that it will not chatter or whip and will therefore produce a smooth cut.

It is also important that all of the teeth be accurately set, that is, bent to one side or the other of the face of the saw, so that all of the teeth will do their proper amount of cutting action.

I have therefore devised an arrangement which may be quickly clamped to a supporting surface such as a table or bench top, after which the saw may be mounted thereon and accurately sharpened, set and ground.

In the accompanying drawings, wherein for the purpose of illustration is shown a preferred embodiment of my invention, the numeral 5 designates a U-shaped clamping member having a leg 6 overlying the table and adapted to be clamped to the table by a threaded member 7. This leg 6 has a slot 8 formed therein, which slot has a shoulder 9, the purpose of which will be later seen.

Slidably mounted in the slot is a square head 11 of an upstanding bolt 12, which engages the shoulders 9 and which is threaded as shown at 13, and upon which a wing nut 14 is threaded.

Slidably mounted upon the bolt 12 is a spacing washer 16, having a squared, downwardly projecting portion 15, slidable in the slot 8 and having an upwardly extending finger 17 which is adapted to enter a slot 18 formed in a downwardly extending hub 19 formed upon a standard 21.

The saw blade A to be sharpened is positioned upon the hub 19 and if necessary a bushing 22 is inserted between the hole in the saw and the periphery of the hub.

When the wing nut 14 is tightened, the standard 21 will be held against rotation with respect to the clamp leg 6. This permits the positioning of a slotted arm 20 to overlie and be parallel with the leg 6 so that a slider 23 may be moved therealong and secured in fixed position by a wing nut 24 directly above an anvil 26. This anvil has an inclined surface 27, the incline varying so that the anvil may be turned and locked in place by a set screw 28, and the purpose of this anvil will be later seen.

Figure 8:
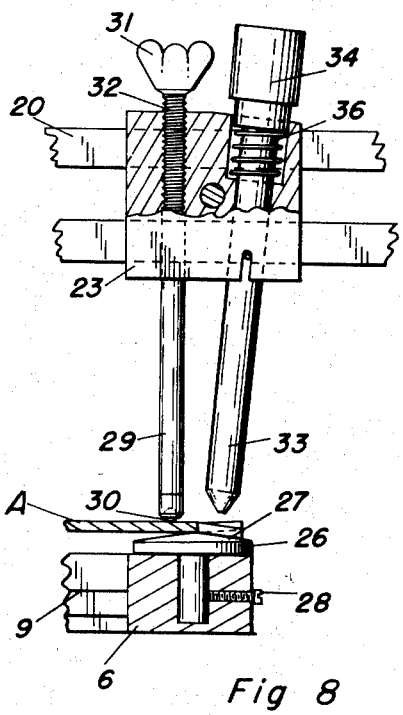
Fig. 8 is an enlarged detail view of the saw set and anvil.

A hold-down bar 29 has a ball 30 which is adapted to contact the top of the saw blade A and to hold it against the anvil 26. This holddown bar is vertically adjustable through the medium of a thumb nut 31, the bar being threaded in the slider 23 as shown at 32 in Fig. 8.

Slidably mounted in the slider 23 is a tooth-setting bar 33, having a head 34 and a spring 36 which normally keeps the lower end of the bar in raised position, the purpose of which will be later seen.

Also slidably mounted on the arm 20 is a clamp having a squared bushing 37 slidable in the slot 38 of the arm 20. A nut 39 serves to lock the bushing in any desired position along the length of the slot.

Rotatably mounted in the bushing is a clamp 41 having a slot 42 therethrough, which serves to slidably support a rod 43 and to adjustably hold the same in vertical position through the medium of a wing nut 44. Slidable upon the top of the arm 20 is a block 46 which has a stop pin 47, the purpose of which will be later seen.

Pivotally supported on the lower end of the rod 43 is a tool holder 48 in which the handle 49 of a grinding wheel 51 is secured.

Figure 6:
Figs. 6 and 7 are plan views of saw bushings.
Figure 7:
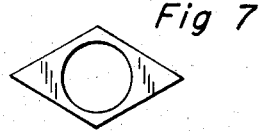
Figure 10:
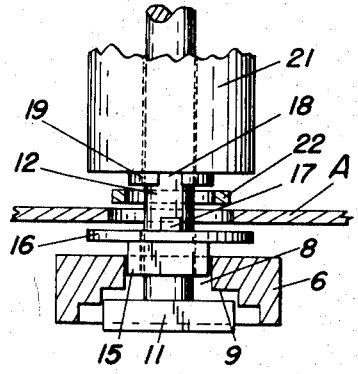
Fig. 10 is a fragmentary view of the slide mounting with the parts expanded.

The result of this construction is that when the user wishes to sharpen and set a circular saw, the wing nut 14 is first removed from the device and the standard 21, with its attached parts, is lifted off from the bolt 12 so as to expose the hub 19. The saw is then fitted to the hub either directly or through the use of bushings 22 (see Figs. 5, 6 and 10), or if the saw has a diamond-shaped opening therein, then a bushing shown in Fig. 7 would be used.

The parts are now replaced upon the bolt 12 and the wing nut 14 tightened after the head of the bolt has been slid sideways to a point where the teeth of the saw will overlie the anvil 26. The nut 14 is now tightened to a point where the entire structure is locked to the clamp against any possible movement.

The slider 23 is now moved along the arm 20 until the tooth-setting bar 33 is directly over the teeth that are to be bent or set against the anvil. This moving of the slider 23 will automatically move the hold-down bar 29 with its ball 30 to the proper position adjacent the anvil, and, by rotating the thumb screw 31, this ball can be brought to bear on the surface of the saw and to counteract any tendency of the saw to bend during the setting operation. By now hitting the head of the tooth-setting bar 33, it will move downwardly against the spring 36, bending the tooth against the anvil and it will then return to its normal position. By now rotating the saw two feet, the next alternate tooth may be set, thus proceeding around the entire periphery of the saw.

Of course, it is understood that the saw is, in most instances, sharpened before the teeth are set.

Now, assuming that it is desired to sharpen the saw, the slider 23 is moved toward the standard 21 and the standard is moved toward the right as shown in Fig. 1, so that the teeth of the saw extend beyond the margin of the anvil, after which the clamp 41 is adjusted so that the grinding wheel 51 is in alignment with the teeth of the saw when the grinder is moved thereagainst through its pivotal support. As the upper end of the rod 43 moves through an arc, it will engage the pin 47 and therefore movement of the grinding wheel will be limited. By now rotating the saw about its pivot, all of the ends of the teeth may be ground so that they are the same distance from the center of the saw.

Figure 9:
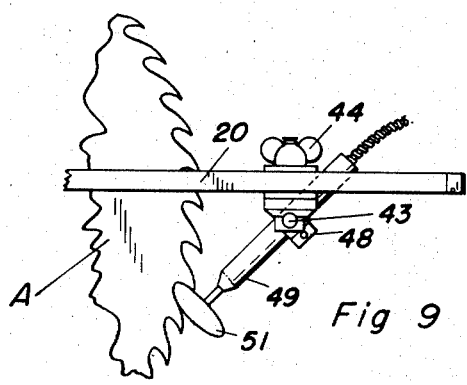
Fig. 9 is a fragmentary detail view showing one position of the grinding wheel.

After the teeth have been ground for length, the clamp 41 may be moved so that the grinder will assume the position shown in Fig. 9, after which the teeth may be ground to any desired depth.

After all of the teeth have been ground, it is then only necessary to set the teeth in the manner previously described.

It will thus be seen that I have produced a device in which the objects set forth above may be accomplished.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A saw sharpening device comprising a supporting clamp having a horizontal portion, a saw positioning standard slidable on said clamp, a fixed slotted arm carried by said standard and overlying said clamp and arranged parallel to said horizontal portion, a grinder wheel pivotally carried by said arm and adapted to be moved into contact with the periphery of said saw.

2. A saw sharpening device comprising a supporting clamp having a horizontal portion, a saw positioning standard slidable on said clamp, a fixed slotted arm carried by said standard and overlying said clamp and arranged parallel to said horizontal portion, a grinder wheel pivotally carried by said arm and adapted to be moved into contact with the periphery of said saw, and a sliding stop carried by said arm and limiting the movement of said grinder toward the center of said saw.

3. A saw sharpening device comprising a supporting clamp having a horizontal portion, a saw supporting standard slidable on said clamp, a fixed slotted arm carried by said standard, said arm overlying said clamp and arranged parallel to said horizontal portion, a bushing adjustable in said slotted arm, a depending rod adjustably supported from said bushing, a grinder carried by the lower end of said rod whereby said grinder may be moved against the peripheral teeth of a saw supported by said clamp and a stop adjustably mounted on said slotted arm and adapted to be engaged by the upper end of said rod to the limit of movement of said grinder toward the saw being sharpened.

CARL E. COPLEY.

References Cited in the file of this patent

UNITED STATES PATENTS

| Number | Name | Date |
|---|---|---|
| 146,392 | Jackson | Jan. 13, 1874 |
| 208,024 | McCray | Sept. 17, 1878 |
| 468,889 | McCarthy | Feb. 16, 1892 |
| 775,035 | Hakes | Nov. 16, 1904 |
| 952,907 | Hunter et al. | Mar. 22, 1910 |
| 1,557,494 | Glang | Oct. 13, 1925 |
| 1,834,237 | Covell | Dec. 1, 1931 |
| 1,852,518 | Harrison | Apr. 5, 1932 |
| 2,453,638 | Nietfeld | Nov. 9, 1948 |